FIG. 1

BERNARD HEINEMANN
IRVING R. HOOPER   *INVENTOR.*
MURRAY A. KAPLAN

*BY* JOHN P. MURPHY
ATTORNEY

March 24, 1964  B. HEINEMANN ETAL  3,126,317
AMPHOMYCIN AND ITS PRODUCTION AND RECOVERY
Filed Nov. 20, 1958  5 Sheets-Sheet 4

FIG. 4

INVENTORS
BERNARD HEINEMANN
IRVING R. HOOPER
MURRAY A. KAPLAN
BY JOHN P. MURPHY
ATTORNEY

FIG. 5

United States Patent Office 3,126,317
Patented Mar. 24, 1964

3,126,317
AMPHOMYCIN AND ITS PRODUCTION
AND RECOVERY
Bernard Heinemann, De Witt, Irving R. Hooper, Fayetteville, and Murray A. Kaplan, Syracuse, N.Y., assignors, by mesne assignments, to Bristol-Myers Company, New York, N.Y., a corporation of Delaware
Filed Nov. 20, 1958, Ser. No. 775,188
14 Claims. (Cl. 167—65)

This invention is concerned with a new and useful antibiotic, called amphomycin, and with its production. More particularly, it relates to processes for its production by fermentation, methods for its recovery and concentration from crude solutions including the fermentation broths, purification thereof and the production of salts of its acidic and its basic forms. The invention embraces the antibiotic and its salts in dilute solutions, as crude concentrates and in more purified, solid form.

This application is a continuation-in-part of our prior co-pending application Serial Number 434,608, filed June 4, 1954, which in turn is a continuation-in-part of our prior application Serial Number 258,524, filed November 27, 1951, and now abandoned.

During the past few years a number of metabolic products of the growth of bacteria and fungi have been isolated and found to possess valuable therapeutic properties. Among these may be mentioned penicillin, streptomycin, gramicidin, tyrocidin, bacitracin, subtilin, streptothricin, Aureomycin and others. Some of these have proven to be extremely valuable because of their effectiveness against pathogenic organisms. Others have been found to be of limited usefulness, as because of their toxicity.

Penicillin is a prominent member of the class of previously described antibiotics which are mainly effective against Gram-positive organisms. Penicillin exhibits several points of weakness, however. Thus penicillin is toxic to certain patients, is relatively inactive orally, is unstable in the presence of water, is inactivated by penicillinase, and tends to lose its effectiveness through development of strains of the organism resistant to the drug.

It is the object of our invention to provide a new antibiotic of good potency, especially against Gram-positive infecting organisms, and suitable for therapeutic use. A further object of the present invention is to provide methods of preparing the above-mentioned antibiotic substance which are suitable for commercial use.

There is provided by the present invention a process for producing amphomycin which comprises cultivating a strain of Streptomyces canus in an aqueous, nutrient-containing carbohydrate solution under submerged aerobic conditions until substantial antibacterial activity is imparted to said solution and then recovering the so-produced amphomycin from the fermentation broth.

Within the purview of our invention and as a further embodiment thereof, we have provided in the process above the steps of decolorizing solutions of amphomycin by activated charcoal, of extracting the antibiotic into a water-immiscible organic solvent under strongly acid conditions or precipitating the amphomycin from aqueous solution by adjusting the pH to a point within the range of pH 3.0 to 4.0, of removing impurities from strongly acid, aqueous solution of amphomycin by extraction of the impurities with methyl isobutyl ketone and amyl acetate, of extracting the amphomycin from a strongly acid solution in butanol by the use of water having a pH higher than 4, of extracting the amphomycin from solution in water-immiscible organic solvent into water whose pH is greater than 6.0, of precipitating amphomycin from solution by formation of insoluble derivatives of the basic function, and of precipitating amphomycin from solution by formation of insoluble derivatives of the acidic function.

There are now also provided by the present invention, substances effective in inhibiting the growth of B. mycoides, B. aureus, M. tetragenus, Staph. aureus and B. subtilis selected from the group consisting of a substance capable of forming salts with acids and metals, that is soluble in water, that exhibits minimum solubility in water between pH 3.0 and 4.0, that is readily soluble in methanol as the acid form and as the salt form, that is soluble in higher alcohols only in the acid form, that is extractable from water at pH 2 by butanol and pentanol, that is not extractable from water at pH 2 by methyl isobutyl ketone, benzene, ether, ethyl acetate and amyl acetate, that yields antibacterially active, solid derivatives of ammonium hydroxide and of Reinecke's salt, that absorbs ultra-violet light only in the 210–230 m$\mu$ region, that exhibits negative response to ninhydrin, Sakaguchi, Molisch, and Ehrlich-Pauly tests, and that is stable for at least ten days in aqueous solution from pH 2 to 10, and the acid and metal salts of such substances.

The drawing (FIG. 1) shows the infra-red absorption spectrum of calcium amphomycin in a potassium bromide pellet. There are characteristic absorption maxima in the infra-red region of the spectrum at the following wave lengths expressed in microns: 3.0, 3.25, 3.4, 5.8 (shoulder), 6.05, 6.13, 6.35, 6.45, 6.53, 6.58, 6.90, 7.07, 7.13, 7.63, 7.90, 8.10, 8.70–9.10 (broad), 9.84, 10.1, 10.92, 11.12 and 11.35–11.70 (broad). The invention is further illustrated by FIGURES 2 and 3 which show exact tracings, reduced about 50 percent in each dimension, of photographs of the agar plates used to obtain the $R_f$ spectrum of amphomycin in several different solvent systems, by FIGURE 4 which is a flow diagram illustrating a preferred method for the isolation and purification of amphomycin and by FIGURE 5 which is a flow diagram illustrating the isoelectric precipitation of amphomycin.

Our novel antibiotic is formed during the cultivation under controlled conditions of a hitherto undescribed species of microorganism which we have called Streptomyces canus. A culture of the living organism, originally called Streptomyces BL-456786 and now called Streptomyces canus, has been deposited in the American Type Culture Collection, Washington, D.C., and added to its permanent collection of microorganisms as ATCC 12237. The description of this organism is set forth in the following.

A mycelium is formed which displays branched hyphae. Young hyphae are Gram-positive (older hyphae variable). Conidia are produced in chains and are spheroidal to ovoidal, measuring 1.0$\mu$–1.2$\mu$ by 1.6$\mu$–1.8$\mu$.

Growth on glucose-asparagine agar was moderate to good at 30° C. A tan diffusible pigment was produced.

Growth on potato-dextrose agar at 24° C. for two weeks is thin and wrinkled but production of aerial hyphae and conidia is inhibited.

Further description of this organism and of amphomycin is given in Antibiotics and Chemotherapy, vol. III, No. 12, pages 1239–1242, December 1953.

The organism is characterized by a well branched vegetative mycelium. Numerous, loosely wound spirals are observed when grown at 30° C. on asparagine-meat extract agar (carbohydrate, 10 gm.; asparagine, 0.5 gm.; beef extract, 2 gm.; $K_2HPO_4$, 0.5 gm.; agar, 15 gm., and distilled water, 1 liter) containing 1 percent of either glycerol, sucrose or maltose. The spheroidal spores are produced in chains and measure 1.0 to $1.2\mu$ in width and 1.6 to $1.8\mu$ in length.

The following growth characteristics are observed on various media (Waksman, S. A.: The Actinomycetes, Chronica Botanica, Waltham, Mass., 1950), at 30° for 14 days.

Potato plug: abundant cream-colored growth; slight reddish brown darkening of the potato, no aerial mycelium.

Glucose asparagine agar: abundant growth; cream-colored substratal mycelium turning a russet-brown with aging; abundant slate gray aerial mycelium; heavily sporulated; amber soluble pigment.

Calcium malate agar (calcium malate, 10 gm.; $NH_4Cl$, 0.5 gm.; agar, 20 gm., and distilled water, 1 liter): moderate growth; golden substratal mycelium; scant aerial mycelium; no soluble pigment.

Czapek-Dox agar: moderate growth; yellow-brown wrinkeld substratal mycelium; scant aerial mycelium; no soluble pigment.

Bennetts' agar (Jones, K. L.: Fresh isolates of actinomycetes in which the presence of sporogenous aerial mycelia is a fluctuating characteristic, J. Bact. 57: 141, 1949): moderate growth; golden wrinkled substratal mycelium; sparse yellow-gray aerial mycelium; faint yellow-brown soluble pigment.

Emerson agar (Baltimore Biological Labs.): abundant growth; amber substratal mycelium; abundant ivory aerial mycelium; heavily sporulated; brownish soluble pigment.

Dextrose nutrient agar: abundant growth; yellow substratal mycelium; white to light yellow aerial mycelium; heavily sporulated; faint yellow soluble pigment.

Potato dextrose agar: moderate wrinkled growth; bronze mycelium; scant aerial hyphae; amber soluble pigment.

The following biochemical reactions are observed when grown on the substrates listed below.

Litmus milk: alkaline with no coagulation; slight peptonization in 14 days.

Gelatin stab: moderate liquefaction at 26° C. in 14 days; no soluble pigment.

Starch: hydrolysis in 96 hours at 30° C.

Nitrate: reduction to nitrite in 96 hours at 30° C. in synthetic medium.

Carbon sources: On Pridhams' inorganic agar (Pridham, T. G., and Gottleib, D.: The utilization of carbon compounds by some actinomycetales as an aid for special determination, J. Bact. 56: 107, 1948) as the basal medium, growth was observed at 28° C. in 10 days with the following as sole carbon sources: arabinose, rhamnose, xylose, dextrose, galactose, fructose, maltose, sucrose, dextrin, inulin, raffinose, soluble starch, glycerol, inositol, cellobiose, lactose, mannitol, and sodium salicylate. No growth was observed with dulcitol, sorbitol, sodium acetate, sodium citrate, sodium formate, sodium malate, sodium oxalate, sodium tartrate, and sodium succinate.

S. canus grows luxuriantly at 28–30° C. in stirred and aerated submerged culture. It produces 300–500 μg./ml. amphomycin, in approximately 50 hours, when grown in the following medium: 1 percent soya bean meal, 1 percent cerelose, 0.5 percent NaCl, 0.05 percent distillers' dried solubles, and 0.1 percent $CaCO_3$. Amphomycin is assayed against Bacillus subtilis (ATCC 6633) by the cylinder plate method. Serial dilution assays have not proven very satisfactory.

The antibiotic readily extracts from water into n-butanol at pH 2–4 and from n-butantol to water at pH 7–9. The distribution coefficient varies with concentration of antibiotic. These properties have been utilized in isolating the antibiotic from culture broths. Material prepared by solvent extraction procedures may be crystallized by reaction of the amorphous sodium salt with calcium chloride in water yielding a poorly defined, crystalline, water-insoluble calcium salt.

Amphomycin is an acidic polypeptide with an isoelectric point of 3.5–3.6. It is soluble in water and the lower alcohols and insoluble in nonpolar solvents.

The antibiotic gives negative ninhydrin, Sakaguchi, Molisch and Ehrlich-Pauly tests. The biuret test is positive. Acid hydrolysis gives a product with increased Van Slyke amino nitrogen values and a positive ninhydrin test. From such hydrolysates several ninhydrin-reacting materials are separable by paper chromatography or ion-exchange chromatography. Amphomycin is optically active, the magnitude of the specific rotation depending on the pH of the solution. A maximum $[\alpha]_D^{25}$ $+7.5 \pm 0.5$ (c.=1, water) is found at pH 6, decreasing at higher or lower pH. The antibiotic is stable in aqueous solution for at least one month at neutral pH and room temperature. It shows only end absorption in the ultraviolet and gives an infrared spectrum typical of a polypeptide. Amphomycin is highly surface active, especially in aqueous solutions at pH 4.5–7.5.

Analytical determinations on the acid and crystalline calcium salt give the following results.

Calcium salt: Found—C, 51.6; H, 6.45; N, 13.02; Ca, 4.8. Free acid: Found—C, 54.4; H, 7.19; N, 14.2.

Titration of amphomycin or its salts indicates the presence of a single free amino group with a pK of 9.0. Three or four acidic groups with overlapping pK curves are present. The minimum molecular weight calculated from the titration of the basic group is 1400–1500.

Amphomycin was tested against various microorganisms on heart infusion agar by the streak method of Waksman and Reilly (Waksman, S. A., and Reilly, H. C.: Agar streak method for assaying antibiotic substances, Indust. Engin. Chem., Anal. Ed. 17: 556, 1945). The results obtained are given in Table I. It will be seen that amphomycin is active against gram-positive bacteria, with little or no activity against gram-negative bacteria or the yeast, Candida albicans.

TABLE I.—MINIMUM INHIBITORY CONCENTRATIONS OF AMPHOMYCIN

| Organism | Concentration, μg./ml. |
|---|---|
| Micrococcus pyogenes var. aureus | 2.5 |
| Gaffkya tetragena | 5 |
| Streptococcus pyogenes C203 [1] | 2.5 |
| Streptococcus agalactiae | 1.25 |
| Streptococcus dysgalactiae | 1.25 |
| Streptococcus uberis | 2.5 |
| Diplococcus pneumoniae [1] | 2.5 |
| Lactobacillus acidophilus | 10 |
| Lactobacillus casei | 5 |
| Lactobacillus leichmannii | 0.5 |
| Bacillus anthracis | 0.5 |
| Bacillus cereus var. mycoides | 0.5 |
| Bacillus subtilis | 5 |
| Corynebacterium xerosis | 0.25 |
| Salmonella typhosa | >100 |
| Escherichia coli | >100 |
| Shigella sonnei | >100 |
| Klebsiella pneumoniae | >100 |
| Proteus vulgaris | >100 |
| Pseudomonas aeruginosa | >100 |
| Candida albicans | >100 |

[1] Assayed on blood agar medium.

The intravenous $LD_{50}$ of the crystalline calcium salt of amphomycin given to mice in 0.5 percent aqueous solution was 120.2 mg./kg. ($\pm 13.2$ mg.) with a slope of 11.8. There were no delayed deaths.

Amphomycin successfully protected mice infected by intraperitoneal inoculation with 100 LD$_{50}$ of *Diplococcus pneumoniae*. Treatment by intraperitoneal route at the time of infection gave a CD$_{50}$ of 0.49 mg./kg.; by intravenous route, 3.33 mg./kg., and by oral route, 125 mg./kg.

Preliminary clinical trials indicate that at high concentrations amphomycin, given parenterally, induces some hemolysis. This observation would seem to restrict its use as a parenteral therapeutic agent. Its potent antibacterial activity combined with its high surface activity makes it highly useful as a topical agent for both animal and plant infections.

It is to be understood that for the production of amphomycin we do not wish to limit ourselves to this particular organism or to organisms fully answering the above description which is given merely for illustrative purposes. We especially wish to include the use of organisms which are mutants produced from the described organisms by mutating agents such as X-radiations, ultraviolet radiation, nitrogen mustards, etc.

Amphomycin shares with penicillin the property of potent activity against bacteria, particularly Gram-positive bacteria. Amphomycin is a valuable therapeutic agent, particularly by topical application, e.g., in human or veterinary medicine. Amphomycin possesses particular advantages over penicillin in topical uses by virtue of the fact that it is not inactivated by penicillinase and in certain cases where there are infections due to penicillin resistant strains, where penicillin is not effective and where patients are sensitive to penicillin. Amphomycin exhibits highly useful resistance to degradation by heat or water.

Amphomycin has been found in in vitro studies to be effective against the Gram-positive bacterial, including *Staphylococcus aureus, Bacillus aureus, Bacillus subtilis, Bacillus mycoides* and *Micrococcus tetragenous*. The attached chart shows the antibiotic activity of two of the solids prepared from the culture fermentation broth.

PLATE SPECTRUM OF AMPHOMYCIN

[5 mg./ml. of solid]

| Organism | Zone of Inhibition | | Organism | Zone of Inhibition | |
|---|---|---|---|---|---|
| | Solid No. 20 | Solid No. 17 | | Solid No. 20 | Solid No. 17 |
| Bodenheimer Org. | 0 | 0 | S. marcescens | 0 | 0 |
| Proteus X19 | 0 | 0 | M. tetragenus | 14 | 14 |
| Sh. sonnei | 0 | 0 | S. flexneri | 0 | 0 |
| S. enteritidis | 0 | 0 | S. dysenteriae | 0 | 0 |
| S. paratyphi A | 0 | 0 | C. albicans #520 | 0 | 0 |
| S. pullorum | 0 | 0 | Staph. aureus | 14 | 13 |
| A. aerogenes | 0 | 0 | E. typhosa | 0 | 0 |
| Ps. fluorescens | 0 | 0 | E. coli | 0 | 0 |
| Alc. fecalis | 0 | 0 | S. paratyphi B | 0 | 0 |
| Pr. vulgaris | 0 | 0 | K. pneumoniae | 0 | 0 |
| V. cholerae | 0 | 0 | Ps. aeruginosa | 0 | 0 |
| Neisseria sp. | 0 | 0 | S. gallinarum | 0 | 0 |
| B. mycoides | 15 | 17 | B. anthracis | 0 | 0 |
| B. cereus | 15 | 14 | B. subtilis | 16 | 11 |

The spectrum test is performed as follows: Approximately 30 ml. of sterile heart infusion broth (Difco), plus 2% agar to solidify it, is placed in a sterile petri dish (3½" diameter), allowed to harden and then a trench 8 mm. x 40 mm. made in the agar with a sterile spatula. The bottom of the trench is sealed with a drop or two of melted agar. A streak is then made from a 24 hour nutrient broth culture of each test bacteria previously incubated at 37° C., with a small loop, streaking from the edge of the trench to the wall of the petri dish. The trench is then filled with a 5 mg./ml. aqueous solution of the antibiotic. The dish is then placed at 37° C. for 18–24 hours. A linear measurement of the zone of inhibition is then made from the edge of the trench to the point where growth of the test organism exists.

The following is the diffusion plate assay method for determining the activity of amphomycin:

*Culture medium.*—Streptomycin assay agar (with yeast extract) was purchased from the Baltimore Biological Laboratories, Baltimore, Maryland, and used as directed on the label. A suitable preparation may be made by suspending in one liter of distilled water to a final pH of 8.0 a mixture of 1.5 grams beef extract, 3 grams yeast extract, 6.0 grams peptone (e.g. Gelysate) and 15 grams agar. The suspension is allowed to stand for five minutes, mixed until a uniform suspension is obtained and heated gently with stirring. The suspension is boiled for one or two minutes or until solution has occurred. The culture medium is then dispensed and sterilized at 121° C. (fifteen pounds per square inch of steam pressure, gauge, for fifteen minutes).

*Inoculum.*—The test organism is *Bacillus subtilis* ATCC 6633. A spore suspension containing 50,000,000 viable spores per ml. is added to melted assay agar (cooled to 53° C.) to give a final inoculum concentration of 2%.

*Preparation of plates.*—Twenty-one ml. of sterile assay agar are placed in level sterile Petri plates and allowed to solidify. Four ml. of inoculated agar are then distributed evenly over the surface of the base layer. Stainless steel assay plates are placed on the medium after the latter has cooled to room temperature.

*Buffer.*—A phosphate buffer at pH 8.0 is used for making dilutions. This is prepared by mixing 95 ml. of molar $K_2HPO_4$ with 5 ml. of molar $KH_2PO_4$ and diluting the mixture to one-tenth concentration with distilled water. The pH of the buffer must be checked potentiometrically and, if necessary, adjusted to pH 8.0 by the addition of one or the other molar phosphate solutions. Variations in pH or concentration of the buffer affect the sizes of inhibition zones markedly. It has not been found necessary to sterilize the buffer. The molar stock solutions are preserved with chloroform and toluene and fresh working solutions are prepared daily.

*Assay.*—Unknown samples are diluted, if required, in the pH 8.0 phosphate buffer. Three depressions on each plate are used to receive a single dilution of the sample. Following incubation at 32° C. the diameters of the zones are measured and averaged.

Amphomycin may be distinguished from Endomycin by the lack of in vitro activity against a strain of the pathogenic fungus, *Trichophyton mentagrophytes*. This is done by placing 25 ml. of a sterile nutrient medium composed of 2% dextrose, 1% neo-peptone, 2% agar, with pH adjusted to 5.6–5.8 in a petri dish and allowing it to harden. An aqueous, spore suspension of *T. mentagrophytes*, from an agar slant, is spread on the surface, steel penicylinders set on the surface and the plates incubated at 30° C. for 24 hours. An aqueous solution containing 10 mg./ml. of the antibiotic to be tested is placed in the cylinders and then the plates returned to incubate at 32° C. for 48 hours. The diameter of inhibition around each cylinder is then measured and an average of at least three zones taken for the reading. The following results were obtained.

| Antibiotic: | Zone of inhibition in mm. |
|---|---|
| Amphomycin, lot 5 | None |
| Endomycin | 24.0 |
| Amphomycin, lot 1 | None |

This invention embraces a process for growing a new and hitherto undescribed species of microorganisms, *S. canus*, at about 24°–30° C. under submerged conditions of agitation and aeration on media consisting of a source of carbon, a source of nitrogen, a source of growth substances, mineral salts such as sodium chloride, potassium phosphate, magnesium sulfate, sodium nitrate, and when desired, a buffering agent such as calcium carbonate.

As a source of carbon in the nutrient medium there may be used:

Ordinary starch
Soluble starch
Sucrose
Glucose
Maltose
Dextrose
Glycerol
Galactose
Xylose
Arabinose
Rhamnose
Fructose
Lactose
Inulin
Dextrins These carbon sources may be supplied to the medium in purified form or in the form of concentrates. The amount of such carbon sources for best antibiotic production in the medium may vary considerably, from about ½% to 5% by weight of the total weight of the fermentation medium.

Suitable sources of nitrogen, including some sources of growth substances, for the fermentation process include a wide variety of substances such as:

Amino acids
Casein, both hydrolyzed and unhydrolyzed
Fish meal
Soybean meal
Meat extracts
Liver cake
Urea
Nitrates
Ammonium compounds
Distillers' grain slops
Corn-steeping liquor
Wheat-steeping liquor
Whey or whey concentrates
Acid hydrolyzed corn gluten
Acid hydrolyzed wheat gluten
Peptone
Offals
Brewers' yeast
Cottonseed meal
Lactalbumin
Tryptone These proteinaceous ingredients need not be supplied in a high degree of purity; the less pure materials which carry traces of growth factors and considerable quantities of mineral nutrients are suitable for use. It is not possible, of course, because of the crude nature of many of these nitrogenous substances to specify definite proportions of the material to be added. An amount of about 0.1% to 5.0% by weight on a solid basis describes the useful range of nitrogenous substances to be added to the media in most cases.

The pH of the fermentation medium should be 7.0-7.2 at the start of the fermentation. The preferred temperature of the fermentation process is about 26°-28° C. The maximum yield of product is usually obtained within 2-7 days, varying with the method of cultivating the Streptomyces.

After growth has been completed, the mycelium is separated from the broth now containing the antibiotic amphomycin and the amphomycin is recovered from the broth by extraction with organic solvents, by precipitation at the isoelectric point or by other means well known to the art. The new antibiotic, amphomycin, produced as aforesaid, possesses unique and valuable properties which distinguish it from all known and previously described antibiotics.

Amphomycin shows a minimum water solubility at pH 3.3-3.6, but is very soluble above or below this pH range. It is readily soluble in methanol either as the acid or salt form and in higher alcohols in the acid form. It is extracted from water by butanol or amylalcohol at pH 2 but not by methyl-isobutyl ketone or anylacetate. From acid butanol solution it may be extracted into water at a pH higher than 3 or 4.

Acid solutions of amphomycin in butanol may be decolorized with carbon and the acid form of the antibiotic precipitated by addition of non-polar solvents such as ethyl acetate, ether, etc.

An aqueous solution (5-20%) of the acid amphomycin in water gives a copious precipitate on adjusting the pH to 3.4-3.5 with alkali. The precipitate redissolves as the pH is raised or lowered.

Insoluble derivatives of the basic function have been obtained. Treatment of the sodium salt in water with Reinecke's salt gives no precipitation but lowering the pH to 2-3 gives a good yield of active reineckate salt. The antibiotic is easily regenerated by dissolving the reineckate salt in acetone and adding ammonium hydroxide to precipitate the active ammonium salt of amphomycin. To date the reineckate has not been crystallized. An oily picrate has been prepared in similar manner.

Amphomycin is stable in water, aqueous solutions at pH 2, 7, or 10 showing no loss after storage at room temperature for 10 days. Solid amphomycin is stable at room temperature.

The purest material prepared to date shows absorption of ultraviolet light only in the 210-230 m$\mu$ region and gives negative ninhydrin, Sakaguchi, Molisch, and Ehrlich-Pauly tests. The product contains carbon, hydrogen, oxygen, and nitrogen. The present samples are white or near-white non-crystalline powders. They give a positive biuret reaction and after hydrolysis with 6 N HCl for 24 hours at 100° C. the ninhydrin test is also positive. Paper chromatography gives evidence of several different ninhydrin-reacting substances in the hydrolyzate.

The properties of amphomycin serve to distinguish it from other antibiotics produced by actinomycetes.

Of those actinomycete antibiotics showing acidic properties, antimycin, actinorhodin, and streptomyces antibiotics X-206, X-464 and X-537 are nitrogen-free substances with no basic properties. The free acid of these substances is soluble in non-polar solvent (ether, benzene, etc.), while amphomycin is not.

Litmocidin and rhodomycetin are pigments, while amphomycin preparations of high potency are white powders.

Of the acidic, nitrogen-containing or amphoteric actinomycetes antibiotics, borrelidin is extractable into benzene at acidic pH while amphomycin is not. Borrelidin has also a very limited antibacterial spectrum. The free acid forms of both endomycin and musarin are water-insoluble, while amphomycin shows a solubility greater than 5% in water at pH 2. Amphomycin is different from Aureomycin and Terramycin in its lack of UV absorption in the significant 220-400 m$\mu$ range.

*Example I*

PREPARATION OF ACTIVITY IN SHAKER BOTTLES

To produce small quantities of amphomycin, the fermentation is conducted in shaker bottles open to the air but protected from contamination with cotton plugs. The *Streptomyces canus* is grown in a suitable nutrient medium by the submerged culture method, agitation and aeration of the culture mixture effected by placing the bottles on a reciprocating type shaker which provides spraying, splashing or spilling of the mash through an oxygen-containing atmosphere. As a typical case, 500 ml. of a culture medium composed of

|  | Percent |
|---|---|
| Soybean meal | 1 |
| Cerelose | 1 |
| NaCl | 0.5 |
| Curbay BG (a brand of distillers' solubles) | 0.05 |
| CaCO$_3$ | 0.1 | are introduced into 4 liter bottles and sterilized. After autoclaving, the medium is inoculated with about 1% by volume, of a turbid aqueous spore suspension of the Streptomyces from an agar slant. The pH is 7.0-7.2 at the start of the fermentation. The contents of the bottle are then incubated at 26°-28° C. for 120 hours while shaking at 130 strokes per minute with a 1¼" stroke. After the incubation period the liquor contains the following activity given as the diameter (millimeters) of the zone of inhibition at the dilution indicated: ($x$) 29.2, ($4x$) 26.2 (determined by the diffusion plate assay procedure described elsewhere). The pH at the end of the fermentation was 7.8.

Example II
PREPARATION OF PILOT PLANT INOCULUM

For larger scale production of amphomycin an inoculum is prepared in a fermentation medium containing, by weight,

| | Percent |
|---|---|
| Soybean meal | 1 |
| Cerelose | 1 |
| NaCl | 0.5 |
| Curbay BG (a brand of distillers' soluble) | 0.05 |
| $CaCO_3$ | 0.1 | made up in a volume of 2500 ml. and introduced into a 2½ gallon bottle. The medium is sterilized with steam at 118°–120° C. for 1 hour. When cool, the medium is inoculated with about 0.5%, by volume, of a turbid, aqueous spore suspension of the *Streptomyces canus* from an agar slant. The contents of the bottle are then incubated at 26°–28° C. for 72–96 hours on a reciprocating type shaker. From the inoculum bottle the broth containing the *Streptomyces canus* is forced into the tank fermenter under completely aseptic conditions.

Example III
LARGE-SCALE PRODUCTION OF AMPHOMYCIN

Amphomycin can be prepared on a large scale by submerged or deep culture of the organism. Stationary vat fermenters equipped with suitable agitation and aeration devices have been found to be useful. A nutrient medium, consisting of 57,000 grams soy bean meal, 57,000 grams cerelose, 28,000 grams $CaCO_3$ and water to make 1500 gallons, with post-sterilization hydrion concentration of pH 6.98, is prepared in a 2000 gallon glass-lined, steel, vertical vat-type fermenter equipped with a water-jacket for temperature control, stainless steel anchor-type impeller, and a double armed perforated stainless steel plate sparger. The medium is sterilized by heating with steam under pressure and cooled. The nutrient medium is inoculated with 15%, by volume, of a 48 hour vegetative culture grown in a similar type fermenter previously inoculated with an inoculum described in Example II. The culture in the 2000 gallon fermenter is incubated at 83° F. for 50 hours. During the incubation the impeller is revolved at the rate of 90 r.p.m. and sterile air passed into the medium at the rate of 100 cubic feet per minute. Analysis of a portion of the culture liquid at the end of the incubation period shows the pH to be 7.68 and the activity, determined by the diffusion plate assay described elsewhere, as follows: ($x$) 18.7; ($4x$) 14.

The activity is given as the diameter in millimeters of the zone of inhibition at the dilution indicated, that is $x$ indicates undiluted and $4x$ indicates diluted to four times the original volume.

The isolation of solid amphomycin from this broth is described in Examples 5 and 6 below.

Example IV
ISOLATION AND PURIFICATION

*Broth extraction.*—Materials are assayed with the use of the cylinder-plate assay response measured in millimeters. Solutions are assayed at several dilutions and a comparision made in this way.

A 30 liter batch of filtered broth was acidified to pH 1.95 with HCl and filtered through a pad of diatomaceous filter aid to give a clear solution. The clear filtrate was stirred with 15 liters of n-butanol for 15 minutes, and the two phases separated. The process was repeated with an additional 48 liters of broth and butanol extracts (40 liters) combined and washed with 10 liters of water acidified to pH 2 with HCl. The butanol was then stirred with 10 liters of water and the mixture adjusted to pH 6.4. The aqueous extract, after 30 minutes stirring was removed, concentrated in vacuo and dried by sublimation from the frozen state. Yield: 20.2 grams of brown powder. A second aqueous extract of the butanol yielded after similar treatment an additional 6.6 grams of brown powder.

Assay results were as follows:

| Material | Response to Diffusion Plate Assay | |
|---|---|---|
| | No dilution, mm. | 1:4 dilution, mm. |
| Starting broth | 24.2 | 20.0 |
| Clarified broth | 25.2 | 20.4 |
| Extracted broth: | | |
| First 30 liters | 14.8 | ¹ none |
| Second 48 liters | 10.4 | ¹ none |
| Acid water wash | none | |
| First aqueous extract (10 liters) | 30.0 | 28.2 |
| Second aqueous extract | 26.0 | 23.1 |
| Solids from first extract: at concentration of 1 mg./ml | 26.0 | 23.1 |
| Solids from second extract: at concentration of 1 mg./ml | 28.9 | 27.0 |

¹ No inhibition.

Example V
ISOLATION

In a later run, 775 gallons of unfiltered broth was adjusted to pH 2.3 and extracted with 310 gal. of n-butanol. The butanol extract was separated and washed with 40 gal. of water at pH 2, then extracted successively with 40 and 20 gal. portions of water, the mixture in each case being adjusted to pH 7.3–7.4 with sodium hydroxide. The aqueous extracts were combined and carried through a second acid butanol and alkaline water extraction series yielding a final rich aqueous extract of 12.1 liters which was spray-dried to give 420 grams of product.

Example VI
CARBON CLARIFICATION AND SOLVENT PRECIPITATION OF CRUDE MATERIAL Twenty grams of the crude sodium salt of amphomycin, prepared as described above in Example V, was dissolved in 500 ml. of water, adjusted to pH 2 with phosphoric acid and extracted with 300 ml. of n-butanol to give a dark brown extract. The separated butanol layer was filtered through a diatomaceous filter aid to remove traces of undissolved water and stirred with 20 grams of activated charcoal (Darco KB) for 30 minutes. The carbon was removed by filtration and the light yellow butanol solution concentrated in vacuo to a volume of 100 ml. This concentrate was added to 2000 ml. of ethyl acetate, giving a copious precipitate of amphomycin which was removed by filtration, washed with acetone, and dried. Yield: 3.4 grams of pale cream-colored solids.

Assays were as follows:

| Material | Response to Diffusion Plate Assay | | |
|---|---|---|---|
| | No dilution, mm. | 1:4 dilution, mm. | 1:16 dilution, mm. |
| 20 g. starting material at 1 mg./ml | 23.1 | 21.1 | 15.8 |
| 3.4 g. purified product at 1 mg./ml | 32 | 27 | 18 |

Example VII
ISOELECTRIC PRECIPITATION

A 10 gram sample of amphomycin prepared by butanol extraction and purification through the carbon treatment and ethyl acetate precipitation as described above was dissolved in 100 ml. of water, to give a clear solution at pH 2.2. The solution was adjusted to pH 3.4 with dilute sodium hydroxide, yielding a viscous, oily precipitate. The mother liquor was separated by decantation, adjusted to pH 6.6 with sodium hydroxide and lyophilized to yield 4.55 grams of solids (A). The precipitate was dissolved in water, adjusted to pH 6.8 and lyophilized, giving 5.69 grams of solids (B).

| Material | Response to Diffusion Plate Assay | | |
|---|---|---|---|
| | 1:4 dilution, mm. | 1:16 dilution, mm. | 1:64 dilution, mm. |
| Starting material at 1 mg./ml. conc. | 29.0 | 23.7 | 14.7 |
| Non-precipitated solids (A) | 26.7 | 21.0 | 11.0 |
| Precipitated solids (B) | 29.0 | 24.0 | 17.0 |

*Example VIII*

PURIFICATION WITH REINECKE SALT

Twenty-five grams of the sodium salt of amphomycin was dissolved in 100 ml. of water and acidified with phosphoric acid to pH 2. This solution was extracted with 250 ml. of n-butanol. The wet butanol extract was treated with 25 grams of activated chacoal (Darco G-60) for one-half hour and filtered. The filtrate was extracted with 500 ml. of water at pH 7.0. The water layer was concentrated slightly in vacuo to remove butanol and adjusted to pH 1.9 with phosphoric acid. Twenty-five grams of Reinecke salt in 200 ml. of water was adjusted to pH 1.9 and added to amphomycin solution. The resulting precipitate was removed by filtration after standing overnight in the refrigerator. The precipitate was redissolved in water by adjusting to pH 7.0 and reprecipitated by adjusting to pH 2.0. The reprecipitated material was removed by filtration, washed with water, dissolved in 150 ml. acetone and filtered. Addition of 1 liter acetone and concentrated ammonium hydroxide to pH 7.5 precipitated the ammonium salt of amphomycin. The material was washed and dried.

Yield: 12.4 grams.

Diffusion plate assays gave the following results:

| Material | 1:16 dilution, mm. | 1:64 dilution, mm. | 1:256 dilution, mm. |
|---|---|---|---|
| Starting material at 1 mg./ml. concentration | 25.3 | 20.7 | 16.0 |
| Final product at 1 mg./ml. concentration | 26.0 | 21.8 | 17.5 |

The amphomycin produced in the above procedures is conclusively characterized, even when contaminated by similar organic chemicals, by its "spectrum" of activity (i.e. degree of migration or $R_f$ values) using a series of solvents in the procedure known as paper strip chromatography. This technique is a relatively new but already well-established procedure for the identification of organic compounds; as with infra-red maxima the $R_f$ values in a series of solvent systems are a unique and reproducible characteristic of a given chemical and serve as a "fingerprint."

The procedure used is as follows. Strips of ash-free, dense, highly retentive filter paper (e.g. 589 Blue Ribbon Special from Carl Schleicher and Schuell Co., Keene, N.H.), one-half inch wide and 58 cm. long, are suspended at constant room temperature in a protected area (i.e. in a large jar) from the edge of a dish. The top of the strip is in contact with a supply of the solvent system (also called developing phase) in the dish; the bottom of the strip hangs free and does not reach the supply of solvent system (or volatile components thereof) placed below the hanging strips to facilitate saturation of the air with the solvent in use.

The product to be examined (i.e., in a fermentation broth or as an isolated solid) is placed on a marked spot at the top of this portion of the strip which hangs free in the air. In the case of a solid, it is dissolved in any useful solvent. The amounts used are those giving a convenient zone size on final assay as determined by simple trial. For example, a useful amount is 5 microliters (0.005 ml.) of a solution containing 100 mgm./ml. water of amphomycin for assay vs. *B. subtilis*. The strip is dried and then placed in position in the dish, which contains the selected solvent system. The solvent is allowed to migrate downward, that is, to develop the strip, until the the solvent front reaches the bottom of the strip. This requires about fifteen hours; the surrounding atmosphere is maintained at a constant temperature free from drafts and saturated with solvent vapor from a pool below.

The strip is then removed, air-dried, and placed on a tray of agar of controlled pH (here 6.2) inoculated with a test organism, in this case *B. subtilis*. After standing in the refrigerator overnight, the strips are removed, and the trays are marked for identification, incubated overnight and either read directly or photographed to give a permanent record.

The outline of the whole strip is visible. The location of each antibiotic agent on the strip is marked by a clear area, which contrasts with the turbid area where the organism has grown. The strip as shown on the photograph is marked off into zones representing 5, 10, 10, 10, 10, 10, 10, 10, 10 and 15 percent of the distance from the point of sample application to the bottom, respectively, and these zones are described as having $R_f$ values of 1 to 10 inclusive. A small spot in the exact center would thus have $R_f 6$, while a larger spot would extend into the adjacent zones and have $R_f$ 5, 6, 7 as the entire zone is counted. Using this technique, the $R_f$ spectra of amphomycin is found to be as follows, using 5 microliters of a 100 mgm./ml. aqueous solution as a sample and assaying with *B. subtilis* in pH 6.2 agar, in the twelve solvent systems:

| Solvent System | A | B | C | D | E | F | G | H | I | J | K | L |
|---|---|---|---|---|---|---|---|---|---|---|---|---|
| Rf Value | 7,8,9 | 5-8 | (1) | 1,2,3,4 | 1 | 8,9,10 | 7-10 | 8,9 | 7,8,9 | 2-5 | 2,3,4 | 1 |

1 Decomposes.

The composition of these solvent systems is as follows:

A—Water.

B—10% aqueous sodium citrate (sometimes amphomycin decomposes in this system).

C—40% aqueous sodium citrate.

D—Butanol saturated with water.

E—Dry methyl isobutyl ketone.

F—A mixture of 100 parts of 80% methanol and 10.5 parts piperidine adjusted to pH with acetic acid.

G—A mixture by volume of 80 parts methanol, 5 parts glacial acetic acid and 15 parts water.

H—Butanol saturated with water and containing 2% p-toluenesulfonic acid.

I—A mixture of 100 mls. of butanol saturated with water and 5 ml. glacial acetic acid.

J—Butanol saturated with water and containing 2% p-toluenesulfonic acid and 2% piperidine.

K—100 parts of butanol saturated with water and 2 grams p-toluenesulfonic acid plus 2 mls. piperidine plus 2 grams lauric acid.

L—A mixture of two parts isoamyl alcohol and one part chloroform, saturated with 10% aqueous sodium citrate. In this case, before applying the sample, the strips are saturated with 10% aqueous sodium citrate adjusted to pH 5.7 with citric acid and dried.

Figure 2:
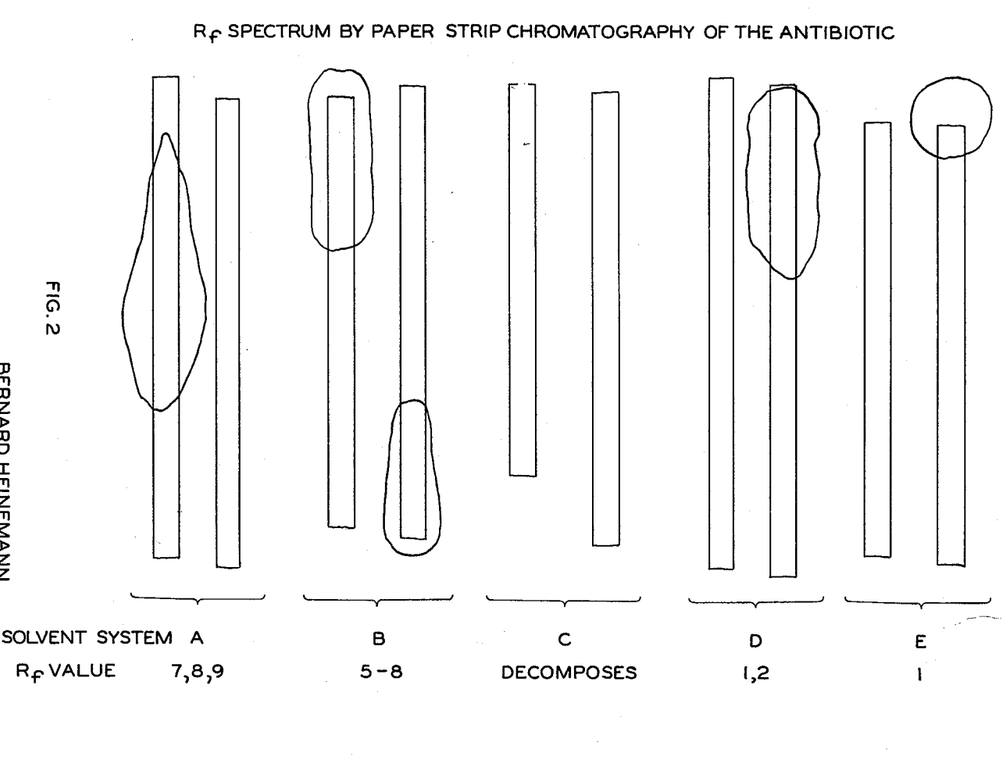
Figure 3:
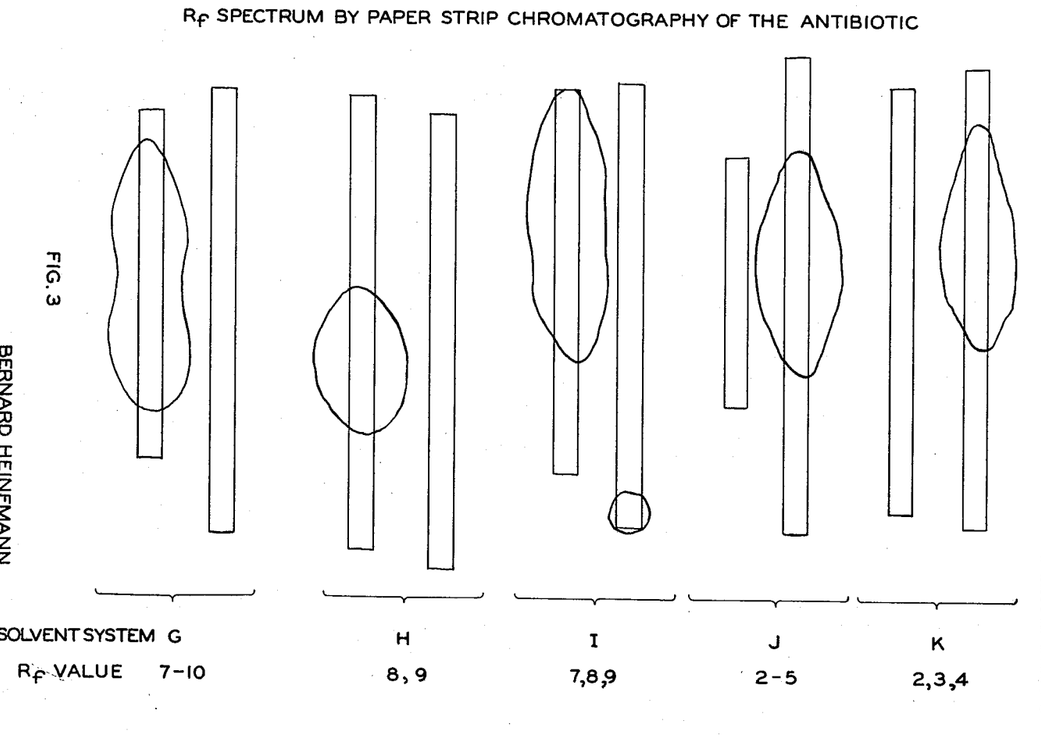
Figure 4:
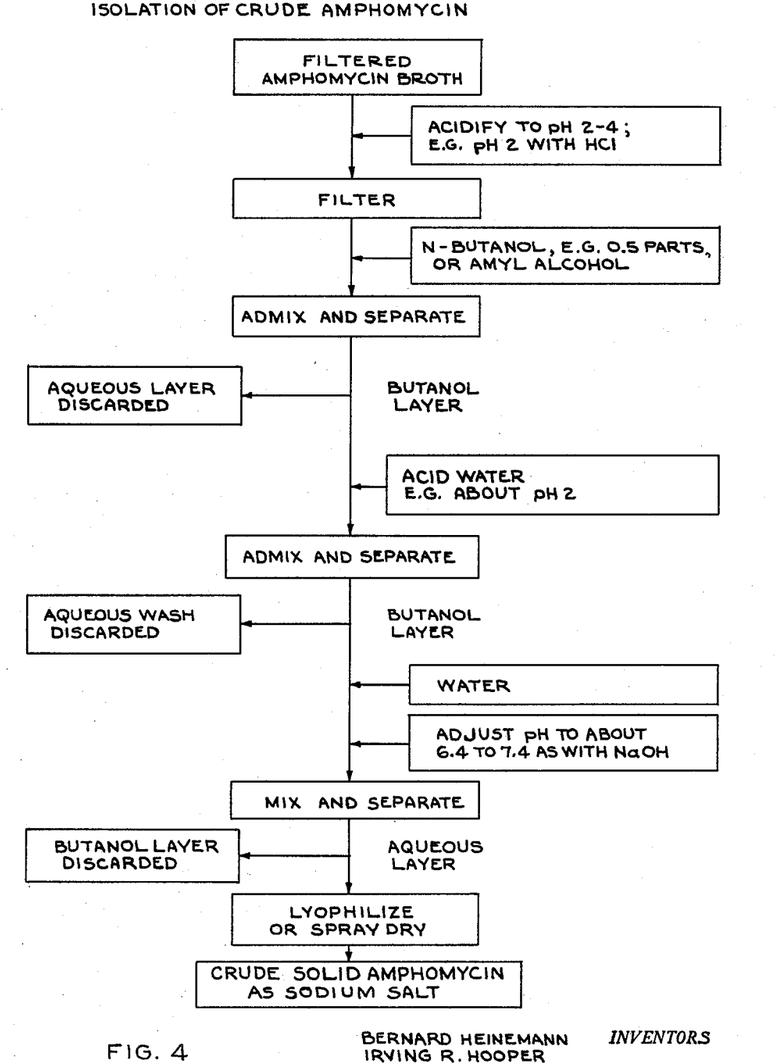
Figure 5:
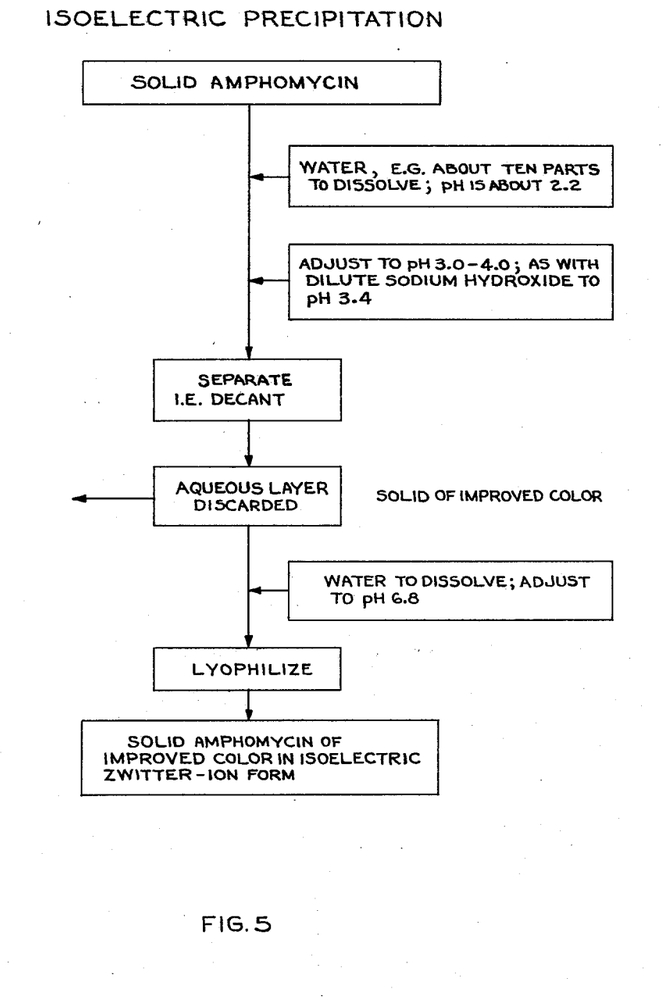

The drawings (FIGURES 2 and 3) show exact tracings, reduced about fifty percent in each dimension, of the photographs of the agar plates used to obtain the $R_f$ spectrum of lot 1 of amphomycin. The drawings show the location of the strips and the point of location of the amphomycin (spot of antibacterial activity). The strip as originally hung is shown in the drawing as reading from the top right hand side to the bottom and then continuing from the top left hand side to the bottom; the strips are cut in half before being laid in the agar trays as they are almost twice as long as the trays. The $R_f$ value obtained and the letter, defined above, identifying the solvent system used, are given on the drawing beneath each strip.

To convert the aforementioned $R_f$ values to conventional $R_f$ values expressed in the decimal system, the stated $R_f$ value (dividend) is divided by 10 and 0.1 subtracted from the quotient. Thus, the $R_f$ of amphomycin in Solvent System E expressed in conventional nomenclature is ($\frac{0}{10}$—.1), i.e., $R_f$=0.0. The $R_f$ values, in the conventional decimal system, of amphomycin in the several solvent systems stated as a range and stated as a single point (in parenthesis) are as follows: A, 0.55–0.85 (0.74); B, 0.35–0.68 (0.52); C, (decomposes); D, 0.01–0.21 (0.1); E, 0.0 (0.0); G, 0.58–0.93 (0.76); H, 0.72–0.88 (0.8); I, 0.54–0.86 (0.7); J, .14–0.44 (0.3); and K, 0.06–0.32 (0.22). The single points stated above are chosen with reference to the total distribution of the antibiotic activity shown on the paper strip.

In a clinical study of twenty patients with various dermatoses, topical application two or three times a day on the affected areas for periods ranging from seven days to nine weeks of an ointment consisting of zinc oxide, zinc stearate, liquid petrolatum and 0.5 percent amphomycin produced no evidence of any primary irritation nor the subsequent development of any sensitization to this preparation. In addition, nine of these patients noted a definite improvement of the dermatoses following the use of this ointment. This preparation was tolerated with no evidence of sensitization by several of these patients who had developed sensitivities to numerous previously applied materials such as benzocaine, ethyl p-aminobenzoate, butesin (the picrate of n-butyl p-aminobenzoate) picrate, vioform (iodochlorohydroxyquinoline), phenol, balsam of Peru, histadyl (N,N-dimethyl-N'-($\alpha$-pyridyl)-N'-(2-methylthienyl) ethylenediamine), surfacaine (the p-cyclohexyloxybenzoic acid ester of N-(3-hydroxypropyl)-pipecoline hydrochloride) and resorcin (n-dihydroxybenzene).

These dermatoses covered the following conditions:

Neurodermatitis
Nummular eczema
Atopic dermatitis
Dyshidrotic eczema
Lichen planus
Dermatitis medicamentosa
Dermatitis venenata
Hyperidrosis
Eczema solare
Exfoliative dermatitis
Paronychia (pustular)
Psoriasis
Lupus erythematosus
Miliaria rubra

We claim:
1. A process for producing amphomycin which comprises cultivating a strain of *Streptomyces canus* in an aqueous, organic nitrogenous nutrient containing, carbohydrate solution under submerged aerobic conditions until substantial antibacterial activity is imparted to said solution and then recovering the so produced amphomycin from the fermentation broth.

2. A process as claimed in claim 1, wherein the recovery of the amphomycin includes the step of decolorization of solutions of amphomycin by activated charcoal.

3. A process as claimed in claim 1, wherein the recovery of the amphomycin includes the step of extracting the antibiotic into a water-immiscible organic solvent selected from the group consisting of butyl alcohols and amyl alcohols at a pH between 2 and 3.5 at about room temperature.

4. A process as claimed in claim 1, wherein the recovery of the amphomycin includes the step of precipitating the amphomycin from aqueous solution by adjusting the pH to a point within the range of pH 3.0–4.0.

5. A process as claimed in claim 1, wherein the recovery of the amphomycin includes the step of precipitating the amphomycin from aqueous solution by adjusting the pH to a point within the range of pH 3.4–3.5.

6. A process as claimed in claim 1, wherein the recovery of the amphomycin includes the step of removing impurities from a strongly acid, aqueous solution of amphomycin by extraction of the impurities with a member selected from the group consisting of methyl isobutyl ketone and amyl acetate.

7. A process as claimed in claim 1, wherein the recovery of amphomycin includes the step of extracting the antibiotic from solution in a water-immiscible organic solvent selected from the group consisting of butyl alcohols and amyl alcohols into water whose pH is between 7 and 9.

8. A process for producing amphomycin which comprises cultivating a strain of *Streptomyces canus* in an aqueous, organic nitrogenous nutrient containing, carbohydrate solution under submerged aerobic conditions at a temperature of from about 24° C. to about 30° C. for a period of from about 2 to 7 days, until substantial antibacterial activity is imparted to said solution and then recovering the so produced amphomycin from the fermentation broth.

9. A process for producing an amphomycin fermentation broth, which comprises cultivating a strain of *Streptomyces canus* in an aqueous, organic nitrogenous nutrient containing, carbohydrate solution under aerobic conditions, until substantial antibacterial activity is imparted to said solution.

Figure 1:
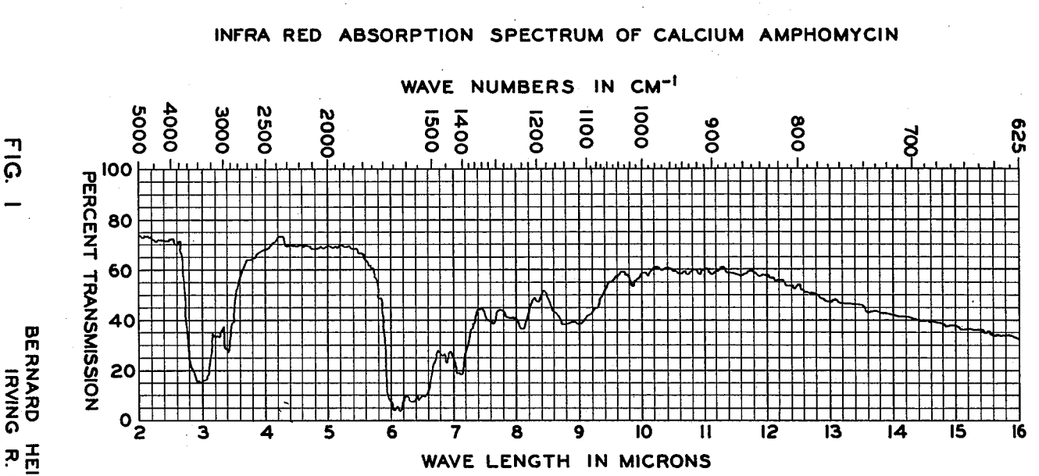

10. A substance selected from the group consisting of a polypeptide, its metal salts and its acid additional salts, said polypeptide being colorless, amphoteric, highly surface-active, exhibiting potent activity against Gram-positive bacteria and substantially no activity against Gram-negative bacterial, having an isoelectric point of 3.4–3.6, a molecular weight of about 1400 to 1500 and a maximum optical rotation $[\alpha]_D^{25}$ of +7.5° (c.=1 in water) at pH 6, containing the elements carbon, hydrogen, nitrogen and oxygen in substantially the following proportions:

carbon 54.4%
hydrogen 7.2%
nitrogen 14.2% and
oxygen 24.2% (by difference)

containing a single free amino group with a pK of 9.0, exhibiting only end absorption of ultraviolet light, exhibiting a positive biuret test and negative ninhydrin, Sakaguchi, Molisch and Ehrlich-Pauly tests, being stable in aqueous solutions from pH 2 to 10 for at least 10 days at room temperature, extracting readily from water into n-butanol at pH 2 to 4 and extracting readily from n-butanol to water at pH 7 to 9 and exhibiting, in the form of its calcium salt pelletized in potassium bromide, characteristics infrared absorption spectra as shown in FIGURE 1 including the characteristic absorption maxima in the infra-red region of the spectrum at the following wave lengths expressed in microns: 3.0, 3.25, 3.4, 5.8 (shoulder), 6.05, 6.13, 6.35, 6.45, 6.53, 6.58, 6.90, 7.07, 7.13, 7.63, 7.90, 8.10, 8.70–9.10 (broad), 9.84, 10.1, 10.92, 11.12 and 11.35–11.70 (broad).

11. A colorless, amphoteric polypeptide which is highly surface-active, exhibits potent activity against Gram-positive bacteria and substantially no activity against Gram-negative bacteria, has an isoelectric point of 3.4–3.6, a molecular weight of about 1400 to 1500 and a maximum optical rotation $[\alpha]_D^{25}$ of $+7.5°$ (c.=1 in water) at pH 6, contains the elements carbon, hydrogen, nitrogen and oxygen in substantially the following proportions:

carbon 54.4%
hydrogen 7.2%
nitrogen 14.2% and
oxygen 24.2% (by difference)

contains a single free amino group with a pK of 9.0, exhibits only end absorption of ultraviolet light, exhibits a positive biuret test and negative ninhydrin, Sakaguchi, Molisch and Ehrlich-Pauly tests, is stable in aqueous solutions from pH 2 to 10 for at least ten days at room temperature, extracts readily from water into n-butanol at pH 2 to 4 and extracts readily from n-butanol to water at pH 7 to 9 and exhibits, in the form of its calcium salt pelletized in potassium bromide, characteristic infrared absorption spectra as shown in FIGURE 1 including the characteristic absorption maxima in the infra-red region of the spectrum at the following wave lengths expressed in microns: 3.0, 3.25, 3.4, 5.8 (shoulder), 6.05, 6.13, 6.35, 6.45, 6.53, 6.58, 6.90, 7.07, 7.13, 7.63, 7.90, 8.10, 8.70–9.10 (broad), 9.84, 10.1, 10.92, 11.12 and 11.35–11.70 (broad).

12. A calcium salt of the amphoteric substance defined in claim 11.

13. A sodium salt of the amphoteric substance defined in claim 11.

14. A hydrochloride of the amphoteric substance defined in claim 11.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,602,767 | Walton et al. | July 8, 1952 |
| 2,633,445 | Marsh et al. | Mar. 31, 1953 |
| 2,653,899 | Bunch et al. | Sept. 29, 1953 |
| 2,723,216 | Cohen | Nov. 8, 1955 |
| 2,746,902 | Gottlieb et al. | May 22, 1956 |
| 2,797,183 | Hagen et al. | June 25, 1957 |
| 2,895,876 | Davisson et al. | Mar. 25, 1959 |
| 2,909,464 | DeBoer et al. | Oct. 20, 1959 |
| 2,909,517 | DeBoer et al. | Oct. 20, 1959 |

OTHER REFERENCES

Lapage et al.: J. Biol. Chem., vol. 162, January 1946, pp. 165–170.

Reynolds: Proc. Soc. Expt'l Biol. & Med., pp. 50–54, vol. 64, 1947.

Johnson et al.: J. of Bact., vol. 54, p. 281, Sept. 10, 1947.

Waksman: "The Actinomycetes," pp. 116 and 117, publ. 1950.

Welsch: Jour. Bact. (1942), 44, pp. 571 to 588.

Heinemann et al.: Antibiotics & Chemotherapy, December 1953, pp. 1239–1242.

Trisch et al.: Antibiotic Symposium, held in Washington, D.C., Oct. 25–29, 1954, abstract of speech delivered at this symposium, 1 page.

Stevenson: Nature, Sept. 25, 1954, pp. 598–599.

Waksman et al.: "The Actinomycetes and Their Antibiotics," pp. 56–69, 70, 71, and 168–184, 1953, pub. by Williams & Wilkins, Baltimore, Md.

Alexopoulos: Ohio Journal of Science, vol. 41, 1941, pp. 425–430.

Smith: Thesis of University of Wisconsin, Jan. 23, 1953, pp. 55–70.

Bergey's Manual of Determinative Bacteriology, pub. by Williams & Wilkins, January 1948, pp. 939–943.

Digest of Treatment, January 1950, pp. 100–101.

Williams: Review of Scientific Instrument, vol. 19, No. 3, 1948, page 142.

Kirk-Othmer: Encyclopedia of Chemical Tech., vol. 11, pp. 226, 227 and 228, pub. 1953 by Interscience Pub. Co., N.Y.C.

Antibiotics Annual, 1959–60, pp. 194–198, 262–270, 489, 492, 943–953.

Antibiotics Annual, 1958–9, pp. 489–492, 505–509.

Antibiotics Annual, 1957–8; pp. 484–492, 852–855, 878–885, 886–891, 906–914.

Antibiotics Annual, 1956–7; pp. 698, 705.

Antibiotics Annual, 1955–6, pp. 437–441, 560–561, 587, 591, 640–647, 893–896, pub. by Medical Encyl. Inc., N.Y.C.